(12) United States Patent
Feng et al.

(10) Patent No.: US 11,718,135 B2
(45) Date of Patent: Aug. 8, 2023

(54) AIR SPRING UPPER SUPPORT, VEHICLE AIR SPRING ASSEMBLY, AND VEHICLE

(71) Applicant: NIO TECHNOLOGY (ANHUI) CO., LTD, Hefei (CN)

(72) Inventors: Xinyun Feng, Hefei (CN); Tian Yang, Hefei (CN); Qunfei Yao, Hefei (CN); Zhenqiang Wu, Hefei (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 0 days.

(21) Appl. No.: 17/580,868

(22) Filed: Jan. 21, 2022

(65) Prior Publication Data
US 2022/0234406 A1    Jul. 28, 2022

(30) Foreign Application Priority Data
Jan. 22, 2021 (CN) .......................... 202110087826.6

(51) Int. Cl.
*B60G 11/27* (2006.01)

(52) U.S. Cl.
CPC ........ *B60G 11/27* (2013.01); *B60G 2202/152* (2013.01); *B60G 2204/4702* (2013.01); *B60G 2206/424* (2013.01); *B60G 2500/20* (2013.01)

(58) Field of Classification Search
None
See application file for complete search history.

(56) References Cited

U.S. PATENT DOCUMENTS

| 9,701,170 | B2 | 7/2017 | DeBruler et al. |
| 10,578,181 | B2 * | 3/2020 | Street ..................... B60G 11/27 |
| 10,703,158 | B2 | 7/2020 | Pielock et al. |
| 2016/0121681 | A1 * | 5/2016 | Rebernik ............... B60G 11/27 |
| | | | 267/64.27 |
| 2019/0366789 | A1 * | 12/2019 | Naples ............... B60G 17/0525 |

FOREIGN PATENT DOCUMENTS

| CN | 114207312 A | * | 3/2022 | ............. B60G 11/27 |
| DE | 102009051944 | | 6/2020 | |
| EP | 1671822 | | 6/2006 | |

OTHER PUBLICATIONS

Extended Search Report for European Patent Application No. 22152743.5, dated Jun. 30, 2022, 8 pages.

* cited by examiner

*Primary Examiner* — Faye M Fleming
(74) *Attorney, Agent, or Firm* — Sheridan Ross P.C.

(57) ABSTRACT

Provided are an air spring upper support, a vehicle air spring assembly, and a vehicle. The air spring upper support is used for a vehicle air spring. The air spring upper support is configured to be of a split structure having an upper housing and a lower housing, the upper housing and the lower housing are connected to each other and form a receiving space, the air spring upper support further has a bushing, and the bushing is arranged in the receiving space.

10 Claims, 1 Drawing Sheet

AIR SPRING UPPER SUPPORT, VEHICLE AIR SPRING ASSEMBLY, AND VEHICLE

CROSS-REFERENCE TO RELATED APPLICATION

This application claims the benefit of China Patent Application No. 202110087826.6 filed Jan. 22, 2021, the entire contents of which are incorporated herein by reference in its entirety.

TECHNICAL FIELD

The invention relates to the technical field of vehicles, and particularly to a vehicle air spring upper support, a vehicle air spring assembly, and a vehicle.

BACKGROUND ART

With the popularity of vehicles in life, people's requirements for the driving comfort of vehicles are higher and higher. When a vehicle is driving on a road, a jolt will occur when it goes through an uneven road, and an impact of the road on wheels will be transferred to a vehicle body. Springs can damp the impact, convert a kinetic energy into an elastic potential energy, and delay a load on the vehicle body to mitigate the vertical jolt of the vehicle body.

The damping effect of an air spring is more significant than that of a conventional coil spring. In addition, the air spring also has the function of adjusting the height of the vehicle body, which is not available in the coil spring. For these two reasons, the application of air springs is increasing, and especially for luxury vehicles with high comfort requirements, the air springs are almost standard configurations. As one of the key components of load transmission, an air spring upper support is required to have sufficient stiffness and strength to ensure the reliability and durability of the vehicle body, and an appropriate stiffness of a bushing is also required to obtain better comfort.

At present, most of bushings of air spring upper supports adopt press fit, and bushing outer tubes are in interference fit with upper support housings. However, this form of fitting inevitably results in deformation of either the bushing outer tubes or the upper support housings. If the bushing outer tube is provided with an O-shaped seal ring, the seal ring is likely to be damaged during the press fit. Another disadvantage of the press fit is a non-detachability. A great pressing force will be required when the bushing is pressed out, inevitably resulting in damage to the bushing or the housing. This disadvantage of non-detachability has caused great troubles to the after market of parts. When the bushing fails, the entire air spring, and sometimes the entire air spring along with a shock absorber assembly, needs to be replaced because the bushing is not replaceable. In this way, the cost of after-market replacement will greatly increase, and consumers have complained a lot.

CN 111873737 A relates to the technical field of vehicle chassis air suspensions, and discloses an air spring upper support and a vehicle chassis air suspension. The air spring upper support comprises a bottom plate, a support plate and a reinforcement plate, wherein the bottom plate is connected to an air spring; the support plate is disposed above the bottom plate, and comprises a main plate and two wing plates disposed on two sides of the main plate, wherein the main plate is connected to a vehicle frame, and the wing plates and the main plate are disposed at an included angle; and the reinforcement plate is disposed between the bottom plate and the air spring, and comprises a flat plate and two vertical plates disposed on two sides of the flat plate, wherein the flat plate abuts against a bottom wall of a recessed structure, and the vertical plates are connected to the bottom plate.

SUMMARY OF THE INVENTION

An objective of the invention is to solve the problem of high cost of after-market replacement due to the fact that a bushing of a conventional upper support is difficult to detach, and to play shock-absorbing and damping roles on cooperative parts.

In addition, the invention also aims to solve or alleviate other technical problems existing in the prior art.

The invention solves the above problems by providing an air spring upper support, a vehicle air spring assembly, and a vehicle. Specifically, according to one aspect of the invention, provided is an air spring upper support for use in a vehicle air spring, wherein the air spring upper support is configured to be of a split structure having an upper housing and a lower housing, the upper housing and the lower housing are connected to each other and form a receiving space, the air spring upper support further has a bushing, and the bushing is arranged in the receiving space.

Optionally, according to an embodiment of the invention, the bushing is provided with a bushing outer tube, a bushing rubber and a bushing inner tube from outside to inside.

Optionally, according to an embodiment of the invention, the air spring upper support has one or more of the following features:

the bushing outer tube is in interference fit with the upper housing in a radial direction;

the bushing outer tube is in clearance or transition fit with the lower housing in the radial direction;

the bushing rubber is in interference fit with the upper housing in an axial direction;

the bushing rubber is in interference fit with the lower housing in the axial direction;

the bushing outer tube is in clearance fit with the upper housing in the axial direction; and the bushing outer tube is in clearance fit with the lower housing in the axial direction.

Optionally, according to an embodiment of the invention, the bushing inner tube is provided with a through hole for mounting and securing a piston rod of a shock absorber of the vehicle.

Optionally, according to an embodiment of the invention, upper and lower surfaces of the bushing inner tube are configured as planar surfaces.

Optionally, according to an embodiment of the invention, the air spring upper support has one or more of the following features:

the upper housing is made of a cast aluminum, forged aluminum, cast iron or forged steel material;

the lower housing is made of a cast aluminum, forged aluminum, cast iron or forged steel material;

the bushing outer tube is made by press-forming a steel material or machining a steel tube; and the bushing inner tube is made by press-forming or cold-heading a steel or aluminum material.

Optionally, according to an embodiment of the invention, an O-shaped seal ring is arranged on the bushing outer tube and abuts against an inner side of the lower housing.

According to another aspect of the invention, the invention provides a vehicle air spring assembly, comprising a vehicle air spring and any one of the air spring upper supports described above, which are connected to each other.

Optionally, according to an embodiment of the invention, a rubber bellows of the vehicle air spring is hooped around a lower portion of the lower housing.

According to yet another aspect of the invention, the invention provides a vehicle, comprising any one of the vehicle air spring assemblies described above.

The air spring upper support, the vehicle air spring assembly, and the vehicle provided herein have the following advantages: the problem of high cost of after-market replacement caused by the fact that a bushing of a conventional upper support is difficult to detach is solved; a detachable and replaceable upper support bushing is available; the problem of O-shaped seal ring damage is avoided; the machining accuracy of the O-shaped seal ring on the piston rod of the shock absorber is not impaired; and abnormal noise caused by vibration of the bushing during movement of the shock absorber is effectively reduced.

BRIEF DESCRIPTION OF THE DRAWINGS

The foregoing and other features of the invention will be apparent with reference to the accompany drawings, in which.

DETAILED DESCRIPTION OF EMBODIMENTS

It can be readily understood that according to the technical solution of the invention, a person of ordinary skill in the art may propose multiple interchangeable structures and implementations without changing the essential spirit of the invention. Therefore, the following specific embodiments and the accompanying drawings are merely exemplary descriptions of the technical solutions of the invention, and should not be construed as the entirety of the invention or construed as limiting the technical solution of the invention.

Directional terms, such as up, down, left, right, front, rear, front side, back side, top, and bottom, which are or may be mentioned in this description, are defined with respect to the structures shown in the accompanying drawing, and are relative concepts, and therefore may correspondingly vary depending on different positions and different conditions in use. Therefore, these or other orientation terms should not be construed as restrictive terms as well. Moreover, the terms such as "first" "second", "third" or similar expressions are only used for description and distinction purposes, and should not be construed as indicating or implying the relative importance of corresponding components.

Figure 1:
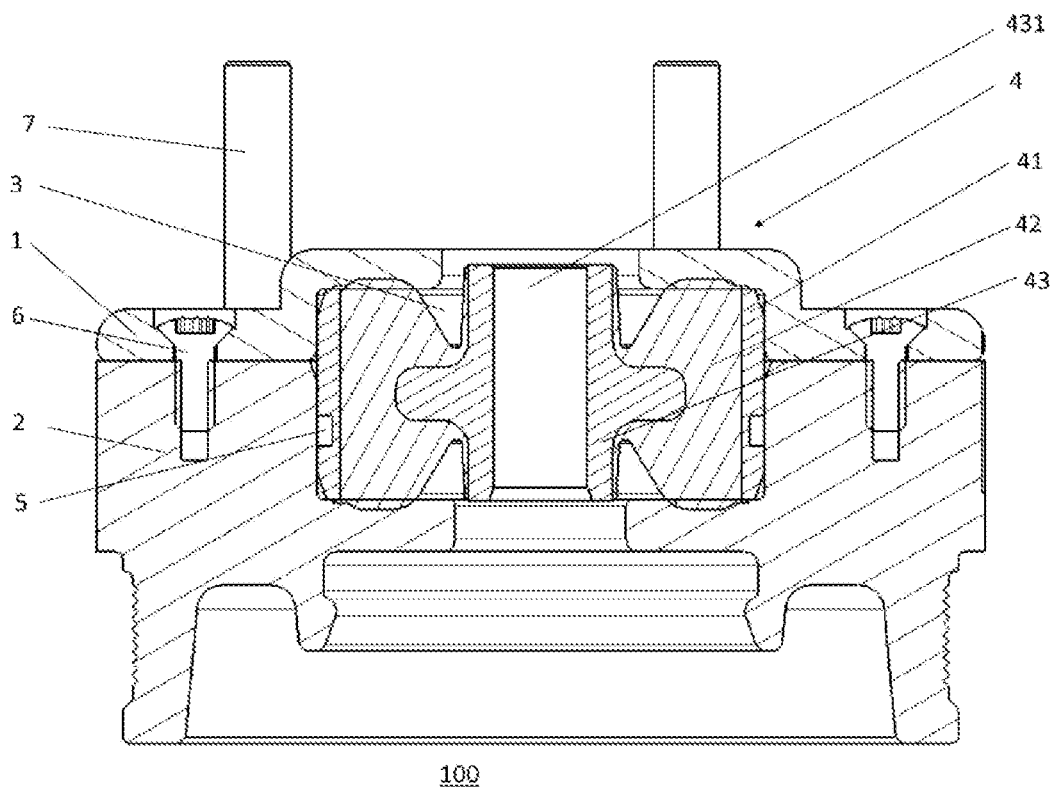
FIG. 1 shows a sectional view of an air spring upper support according to the invention.
Figure 2:
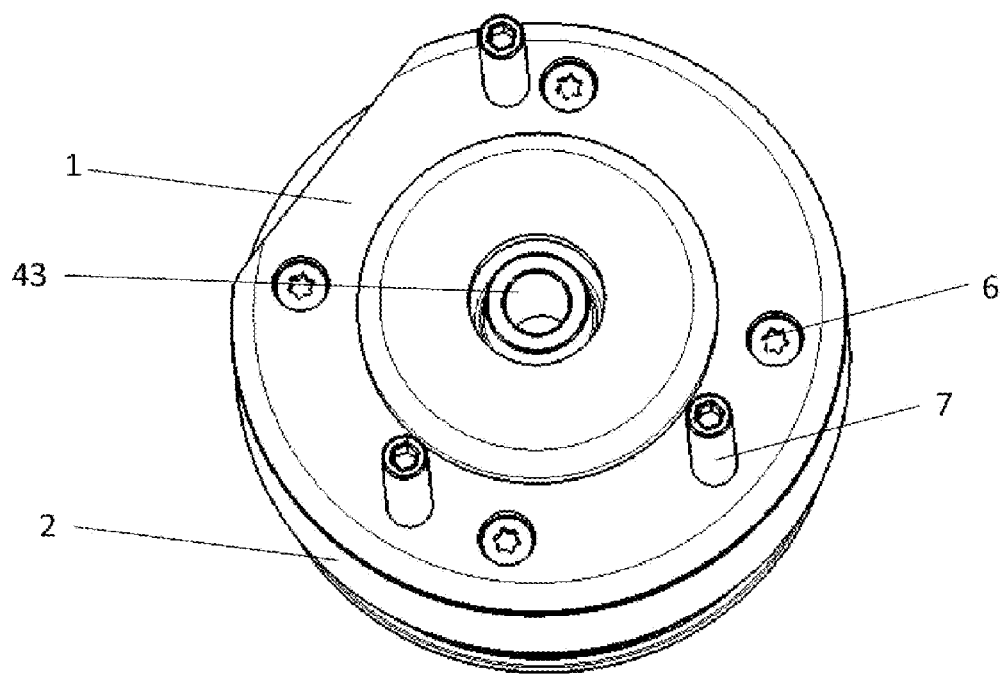
FIG. 2 shows an axonometric view of an air spring upper support according to the invention.

Referring to FIGS. 1 and 2, a sectional view of an air spring upper support 100 according to the invention and an axonometric view of an air spring upper support 100 according to the invention are shown respectively.

The air spring upper support 100 is used for a vehicle air spring. The air spring upper support 100 is configured to be of a split structure having an upper housing 1 and a lower housing 2, the upper housing 1 and the lower housing 2 are connected to each other and form a receiving space 3, the air spring upper support 100 further has a bushing 4, and the bushing 4 is arranged in the receiving space 3.

By dividing the housing of the upper support into two portions, the problem of high cost of after-market replacement caused by the fact that a bushing of a conventional upper support is difficult to detach is solved. By using the bushing, it is possible to play shock-absorbing and damping roles on the parts cooperating with the air spring upper support, such as wear protection and reduction of abnormal noise. In particular, by means of the technical solution, if the bushing is to be replaced, only the upper housing needs to be detached without the need for dismounting the entire upper support.

The upper housing 1 and the lower housing 2 may be connected to each other in various ways, especially connected one above the other. It should be understood that "connected one above the other" is relatively described (including the way of naming the upper support, the upper housing, and the lower housing) and do not absolutely indicate that all portions of the upper housing are located above the lower housing, but that the upper housing is substantially and generally located above the lower housing. With regard to the connection of the upper and lower housings, it is exemplified that the upper housing 1 and the lower housing 2 are secured to each other by means of threaded fasteners 6. The threaded fasteners 6 are arranged at an outer side portions of the upper and lower housings and introduced into the upper and lower housings from top to bottom. The threaded fastener is a mechanical part that is either internally threaded or externally threaded and is generally used as a fastener to facilitate assembly of multiple components. The most common threaded fasteners are screws, nuts and bolts. However, there are other threaded fasteners, such as cage nuts, threaded inserts and threaded rods. Moreover, the threaded fastening connection is a detachable fixed connection used widely, and has the advantages of simple structure, reliable connection, convenient assembly and disassembly, etc.

The upper housing 1 in the embodiment shown in the figures is in the shape of a cover with a low and flat periphery and a high and flat middle, while the lower housing 2 is in the shape of a tube with internal ribs for supporting the bushing 4, and the lower portion of the lower housing 2 is used for connecting an airbag of the vehicle air spring. For connection with a vehicle body, it is possible, for example, to arrange studs 7 at the periphery of the upper housing 1, and an air spring assembly (including the entire air spring upper support 100) is connected to the vehicle body by means of the studs 7. Of course, other threaded fasteners or connecting means could similarly be used instead of the studs 7.

The bushing 4 is provided with a bushing outer tube 41, a bushing rubber 42 and a bushing inner tube 43 from outside to inside. The bushing inner tube 43 may also have, for example, a protrusion portion to facilitate form-fit connection with a corresponding recessed portion of the bushing rubber 42. The fitting between the bushing 4 and the upper housing 1 and the lower housing 2 is as follows:

the bushing outer tube 41 is in interference fit with the upper housing 1 in a radial direction, and thus the entire bushing 4 does not play in the receiving space 3;

the bushing outer tube 41 is in clearance or transition fit with the lower housing 2 in the radial direction, and the upper housing 1 and the bushing 4 are separately detached, without the need for detaching the larger lower housing 2 which is connected to the airbag of the air spring and is more difficult to detach;

the bushing rubber 42 is in interference fit with the upper housing 1 in an axial direction, and the upper housing 1 is pressed against the bushing rubber 42 in the axial direction, so that abnormal noise caused by vibration of the bushing inner tube 43 during the movement of a shock absorber can be effectively reduced;

the bushing rubber 42 is in interference fit with the lower housing 2 in the axial direction, and the lower housing 2 is pressed against the bushing rubber 42 in the axial direction, so that abnormal noise caused by vibration of the bushing inner tube 43 during the movement of the shock absorber can be effectively reduced;

the bushing outer tube 41 is in clearance fit with the upper housing 1 in the axial direction to prevent over-constraint; and the bushing outer tube 41 is in clearance fit with the lower housing 2 in the axial direction to prevent over-constraint.

It should be understood that interference fit refers to achieving tight fit between parts by using the elasticity and deformation of materials, clearance fit refers to the fit with a clearance between parts, and transition fit means that either clearance fit or interference fit may exist between parts during assembly. The above-mentioned fitting may be used alone or in combination according to the actual situation as long as there is no conflict with one another.

The bushing inner tube 43 is provided with a through hole 431, and the through hole 431 is used for mounting and securing a piston rod of a shock absorber of the vehicle. When the air spring upper support 100 is used for the vehicle air spring, the piston rod of the shock absorber of the vehicle passes through the through hole 431 from bottom to top. In addition, a nut may be arranged on the bushing inner tube 43, and similar to the bushing inner tube 43, the nut serves to secure the piston rod of the shock absorber. Upper and lower surfaces of the bushing inner tube 43 may also be configured as planar surfaces to facilitate mounting and securing of the shock absorber.

With regard to the materials and manufacturing methods of various parts of the air spring upper support 100, it is exemplified that the upper housing 1 is made of a cast aluminum, forged aluminum, cast iron or forged steel material;

the lower housing 2 is made of a cast aluminum, forged aluminum, cast iron or forged steel material;

the bushing outer tube 41 is made by press-forming a steel material or machining a steel tube; and the bushing inner tube 43 is made by press-forming or cold-heading a steel or aluminum or alloy material.

The cast aluminum is a cast aluminum alloy, the cast iron is a cast iron alloy (which is an alloy generally composed of iron, carbon and silicon), and so on. Furthermore, press-formed parts have the characteristics of thinness, uniformity, lightness, high strength and high workpiece precision. In particular, workpieces with reinforcing ribs, ridges, undulations or flanges may be formed to improve the stiffness thereof. Cold-headed parts have excellent mechanical properties, high precision and high surface finish.

Optionally, an O-shaped seal ring 5 may also be arranged on the bushing outer tube 41, and the O-shaped seal ring 5 abuts against an inner side of the lower housing 2. Air inside the air spring between the bushing outer tube 41 and the lower housing 2 is sealed by the O-shaped seal ring 5, thereby further supporting the arrangement in which the bushing outer tube 41 is in clearance fit with the lower housing 2 in the axial direction and the bushing outer tube 41 is in clearance or transition fit with the lower housing 2 in the radial direction. Moreover, in the fitting of the bushing 4 with respect to the upper housing 1, the problem of damage to the O-shaped seal ring 5 during detaching is also avoided.

In this regard, the through hole 431 of the bushing inner tube 43 should be machined in order not to impair the machining precision of the O-shaped seal ring on the piston rod of the shock absorber.

The invention also relates to a vehicle air spring assembly, comprising a vehicle air spring and any one of the air spring upper supports 100 described above, which are connected to each other. The vehicle air spring is arranged below the lower housing 2, the upper housing 1 is connected to a vehicle body, the shock absorber of the vehicle is located below the lower housing 2, and the piston rod thereof passes through the bushing 4 from bottom to top and thus protrudes upwards through the entire air spring upper support 100.

A rubber bellows of the vehicle air spring may be hooped around a lower portion of the lower housing 2. That is to say, the rubber bellows is hooped to the lower portion of the lower housing 2, such as a downwardly extending peripheral portion of the lower housing 2, by means of a hooping member, such as a snap ring, to complete assembly.

It should be understood that the vehicle air spring assembly of the invention may be mounted on various vehicles, including gasoline vehicles, diesel vehicles, cars, vans, buses, hybrid vehicles, battery electric vehicles, and so on. Therefore, the subject matter of the invention further aims to set forth various vehicles provided with the vehicle air spring assembly according to the invention.

It should be understood that all of the above preferred embodiments are exemplary rather than limiting, and any modification or variation made by those skilled in the art to the specific embodiments described above without departing from the concept of the invention shall fall within the scope of legal protection of the invention. For example, while the invention is described herein in connection with a vehicle suspension air spring, it will be apparent that the invention may be applied to air springs in various other parts, as long as the air spring upper support bushing needs to be detached for maintenance.

What is claimed is:

1. An air spring upper support, the air spring upper support being used for an air spring of a vehicle, wherein the air spring upper support is configured to be of a split structure having an upper housing and a lower housing, the upper housing and the lower housing are connected to each other and form a receiving space, the air spring upper support further has a bushing, and the bushing is arranged in the receiving space.

2. The air spring upper support according to claim 1, wherein the bushing is provided with a bushing outer tube, a bushing rubber and a bushing inner tube from outside to inside.

3. The air spring upper support according to claim 2, wherein the air spring upper support has one or more of the following features:

the bushing outer tube is in interference fit with the upper housing in a radial direction;

the bushing outer tube is in clearance fit with the lower housing in the radial direction;

the bushing rubber is in interference fit with the upper housing in an axial direction;

the bushing rubber is in interference fit with the lower housing in the axial direction;

the bushing outer tube is in clearance fit with the upper housing in the axial direction; and the bushing outer tube is in clearance fit with the lower housing in the axial direction.

4. The air spring upper support according to claim 2, wherein the bushing inner tube is provided with a through hole, and the through hole is configured to mount and secure a piston rod of a shock absorber of the vehicle.

5. The air spring upper support according to claim 2, wherein upper and lower surfaces of the bushing inner tube are configured as planar surfaces.

6. The air spring upper support according to claim 2, wherein the air spring upper support has one or more of the following features:
- the upper housing is made of a cast aluminum, forged aluminum, cast iron or forged steel material;
- the lower housing is made of a cast aluminum, forged aluminum, cast iron or forged steel material;
- the bushing outer tube is made by press-forming a steel material or machining a steel tube; and
- the bushing inner tube is made by press-forming or cold-heading a steel or aluminum material.

7. The air spring upper support according to claim 2, wherein an O-shaped seal ring is arranged on the bushing outer tube, and the O-shaped seal ring abuts against an inner side of the lower housing.

8. A vehicle air spring assembly, comprising a vehicle air spring and the air spring upper support according to claim 1, which are connected to each other.

9. The vehicle air spring assembly according to claim 8, wherein a rubber bellows of the vehicle air spring is hooped around a lower portion of the lower housing.

10. A vehicle, comprising the vehicle air spring assembly according to claim 8.

\* \* \* \* \*